United States Patent
Cho et al.

(10) Patent No.: US 9,977,251 B2
(45) Date of Patent: May 22, 2018

(54) DISPLAY DEVICE AND A DRIVING METHOD FOR THE DISPLAY DEVICE

(71) Applicant: SAMSUNG DISPLAY CO., LTD., Yongin-si, Gyeonggi-do (KR)

(72) Inventors: Jung-Hyun Cho, Seoul (KR); Seung Jun Jeong, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 86 days.

(21) Appl. No.: 14/847,995

(22) Filed: Sep. 8, 2015

(65) Prior Publication Data

US 2016/0216540 A1 Jul. 28, 2016

(30) Foreign Application Priority Data

Jan. 26, 2015 (KR) .................. 10-2015-0012373

(51) Int. Cl.
*G02B 27/22* (2018.01)
*G02F 1/1335* (2006.01)
(Continued)

(52) U.S. Cl.
CPC ......... *G02B 27/22* (2013.01); *G02F 1/13471* (2013.01); *G02F 1/133526* (2013.01); *G02F 1/133536* (2013.01); *G02F 1/134309* (2013.01); *G02F 2001/133562* (2013.01); *G02F 2001/133638* (2013.01); *G02F 2001/134381* (2013.01); *G02F 2203/62* (2013.01)

(58) Field of Classification Search
CPC .................. G02B 27/22; G02B 27/26; G02F 2001/133562

USPC ........................................................... 349/15
See application file for complete search history.

(56) References Cited

U.S. PATENT DOCUMENTS 6,847,427 B2 * 1/2005 Yamauchi ........... G02F 1/13471
349/113
7,057,681 B2 * 6/2006 Hinata .............. G02F 1/133528
349/113
(Continued)

FOREIGN PATENT DOCUMENTS

JP 2004-279946 10/2004
KR 100976623 8/2010
(Continued)

*Primary Examiner* — Christopher Raabe
(74) *Attorney, Agent, or Firm* — F. Chau & Associates, LLC.

(57) ABSTRACT

A display device includes a display panel, a first polarizer, a liquid crystal lens, a first quarter-wave plate, and a second quarter-wave plate. The display panel displays an image. The first polarizer disposed on the display panel reflects a first light having a polarization direction parallel to a reflection axis of the first polarizer. The liquid crystal lens includes liquid crystal molecules and changes a phase of the first light or a second light according to a driving signal applied to the liquid crystal lens. The second and first lights travel in opposite directions with respect to each other. The first quarter-wave plate is disposed between the first polarizer and the liquid crystal lens. The second quarter-wave plate is disposed between the liquid crystal lens and a second polarizer. The display device operates in a mirror mode, a three-dimensional mode, and a two-dimensional mode according to the driving signal.

11 Claims, 19 Drawing Sheets

(51) Int. Cl.
*G02F 1/1343* (2006.01)
*G02F 1/1347* (2006.01)
*G02F 1/13363* (2006.01)

(56) References Cited

U.S. PATENT DOCUMENTS

| | | | |
|---|---|---|---|
| 7,106,396 B2 * | 9/2006 | Suzuki | G02F 1/133536 349/113 |
| 7,495,719 B2 | 2/2009 | Adachi et al. | |
| 7,750,981 B2 * | 7/2010 | Shestak | G02B 27/2214 349/15 |
| 7,903,335 B2 | 3/2011 | Nieuwkerk et al. | |
| 2009/0316090 A1 * | 12/2009 | Fujikawa | G02F 1/133512 349/110 |
| 2012/0313918 A1 * | 12/2012 | Qin | G02F 1/133555 345/211 |
| 2014/0255701 A1 * | 9/2014 | Lee | H01B 1/04 428/408 |
| 2014/0362315 A1 * | 12/2014 | Murao | G02B 27/26 349/15 |

FOREIGN PATENT DOCUMENTS

| | | |
|---|---|---|
| KR | 1020110104701 | 9/2011 |
| KR | 1020140019744 | 2/2014 |

\* cited by examiner

DISPLAY DEVICE AND A DRIVING METHOD FOR THE DISPLAY DEVICE

CROSS-REFERENCE TO RELATED APPLICATION

This application claims priority under 35 U.S.C. § 119 to Korean Patent Application No. 10-2015-0012373, filed on Jan. 26, 2015, in the Korean Intellectual Property Office, the disclosure of which is incorporated by reference herein in its entirety.

TECHNICAL FIELD

The present invention relates to a display device, and more particularly, to a display device and a method of driving the display device.

DISCUSSION OF THE RELATED ART

A display device may display a three-dimensional (3D) image. In displaying a 3D image, the display device divides the image into a left-eye image and a right-eye image having a binocular disparity to a left eye and a right eye of an observer, respectively. The observer may perceive the left-eye image and the right-eye image as a 3D image. The display device for displaying the 3D image may include a lenticular scheme.

In the lenticular scheme, a Fresnel lens may be used to refract light.

SUMMARY

According to an exemplary embodiment of the present invention, a display device is provided. The display device includes a display panel, a first polarizer, a liquid crystal lens, a first quarter-wave plate, and a second quarter-wave plate. The display panel displays an image. The first polarizer is disposed on the display panel. The first polarizer has a reflection axis and reflects a first light having a polarization direction parallel to the reflection axis. The liquid crystal lens includes liquid crystal molecules and changes a phase of the first light or a second light according to a driving signal applied to the liquid crystal lens. The first light and the second light travel in an opposite direction with respect to each other. The first quarter-wave plate is disposed between the first polarizer and the liquid crystal lens. The first quarter-wave plate includes a first alignment axis and performs conversion between a first circularly polarized light and a first linearly polarized light. The second quarter-wave plate is disposed between the liquid crystal lens and a second polarizer. The second quarter-wave plate includes a second alignment axis and performs conversion between a second circularly polarized light and a second linearly polarized light. The display device operates in a mirror mode, a three-dimensional (3D) mode, and a two-dimensional (2D) mode according to the driving signal.

The first alignment axis and the second alignment axis may be substantially parallel to each other.

The liquid crystal lens may include a plurality of lower electrodes. The plurality of lower electrodes may form an electric field in the liquid crystal molecules according to the driving signal. Arrangement directions of the liquid crystal molecules may be determined by the electric field. A driving signal applied to the plurality of lower electrodes may be 0 volt.

In the mirror mode, the driving signal may be applied to the liquid crystal lens so that the liquid crystal molecules are arranged to be substantially vertical with respect to a plane on which the plurality of lower electrodes is arranged.

In the 3D mode, the driving signal may be applied so that the liquid crystal molecules are arranged to generate a binocular disparity for the image by changing the phase of the second light pertaining to the image through the arranged liquid crystal molecules.

In the 2D mode, the driving signal may be applied so that the liquid crystal molecules are arranged in substantially the same direction on a plane on which the plurality of lower electrodes is arranged.

In the 2D mode, the driving signal may be a first threshold voltage driving signal sequentially applied to the plurality of lower electrodes In the 2D mode, the driving signal may be second voltage driving signals. The second voltage driving signals may increase in a step-wise manner, and the second voltage driving signals may sequentially be applied to the plurality of lower electrodes, respectively.

In the 2D mode, the driving signal may be a third voltage driving signal simultaneously applied to the plurality of lower electrodes.

The first alignment axis and the second alignment axis may be substantially vertical to each other.

According to an exemplary embodiment of the present invention, a method for driving a display device is provided. The method includes operating the display device in a mirror mode in which a first polarizer of the display device reflects first light having a polarization direction parallel to a reflection axis of the first polarizer, operating the display device in a three-dimensional (3D) mode in which a 3D image is displayed by generating a binocular disparity for an image in a liquid crystal lens, and operating the display device in a two-dimensional (2D) mode in which the image passes through the liquid crystal lens without being refracted.

The display device may include the display panel, the first polarizer, a first quarter-wave plate, a liquid crystal lens, and a second quarter-wave plate. The display panel may display the image. The first polarizer may be disposed on the display panel. The first quarter-wave plate may be disposed on the first polarizer. The first quarter-wave plate may include a first alignment axis and may perform conversion between a first circularly polarized light and a first linearly polarized light. The liquid crystal lens may be disposed on the first quarter-wave plate. The liquid crystal lens may include liquid crystal molecules. The second quarter-wave plate may be disposed on the liquid crystal lens. The second quarter-wave plate may include a second alignment axis and may perform conversion between a second circularly polarized light and a second linearly polarized light.

The first alignment axis and the second alignment axis may be substantially parallel to each other.

The liquid crystal lens may include a plurality of lower electrodes forming an electric field generated in the liquid crystal lens according to a driving signal applied to the plurality of lower electrodes. The liquid crystal molecules of the liquid crystal lens may be arranged by the electric field.

In the mirror mode, the liquid crystal molecules may be arranged to be substantially vertical with respect to a plane on which the plurality of lower electrodes is arranged.

In the 3D mode, when a second driving signal is applied to the liquid crystal lens as the driving signal, the liquid crystal molecules may be arranged on a plane on which the plurality of the lower electrodes is arranged.

In the 2D mode, when a third driving signal is applied to the liquid crystal lens as the driving signal, the liquid crystal molecules may be arranged in substantially the same direction on a plane on which the plurality of lower electrodes is arranged.

In the 2D mode, the third driving signal may be a first threshold voltage driving signal sequentially applied to the plurality of lower electrodes.

In the 2D mode, the third driving signal may be second voltage driving signals increasing in a step-wise manner, and the second voltage driving signals may sequentially be applied to the plurality of lower electrodes, respectively.

In the 2D mode, the third driving signal may be a third voltage driving signal simultaneously applied to the plurality of lower electrodes.

The first alignment axis and the second alignment axis may be substantially vertical to each other.

According to an exemplary embodiment of the present invention, a display device is provided. The display device includes a display panel, a first polarizer, a first quarter-wave plate, a liquid crystal lens, a second quarter-wave plate, and a second polarizer. The display panel displays an image. The first polarizer is disposed on the display panel. The first polarizer has a reflection axis and a transmission axis. The first quarter-wave plate is disposed on the first polarizer. The first quarter-wave plate has a first alignment axis. The liquid crystal lens is disposed on the first quarter-wave plate. The liquid crystal lens includes liquid crystal molecules arranged according to a driving signal applied to the liquid crystal lens. The second quarter-wave plate is disposed on the liquid crystal lens. The second quarter-wave plate has a second alignment axis. The second polarizer is disposed on the second quarter-wave plate. The second polarizer has a penetration axis. The display device operates in a mirror mode, a three-dimensional (3D) mode, and a two-dimensional (2D) mode according to the driving signal applied to the liquid crystal lens. The first polarizer reflects first light having a polarization direction parallel to the reflection axis in the mirror mode. The first polarizer transmits second light having a polarization direction parallel to the transmission axis in the 3D mode or the 2D mode. The first alignment axis forms an angle of 45 degrees or 135 degrees with respect to the second alignment axis.

BRIEF DESCRIPTION OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
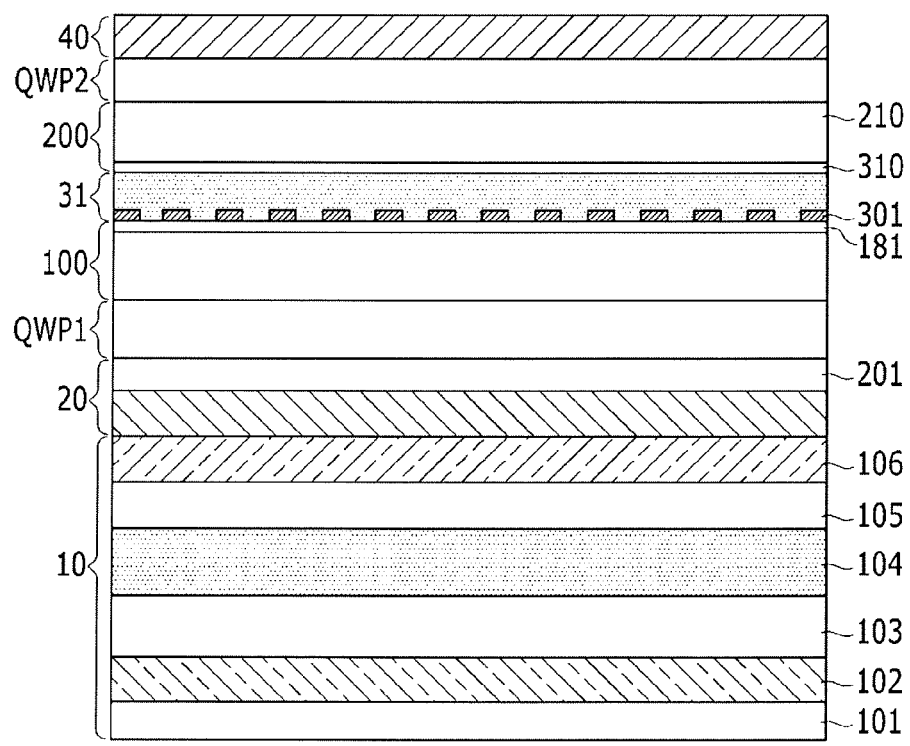
FIG. 1 is a cross-sectional view of a display device according to an exemplary embodiment of the present invention.

Hereinafter, exemplary embodiments of the present specification will be described in detail with reference to the accompanying drawings. Like or similar reference numerals may refer to like or similar elements and a duplicated description thereof will be omitted. The accompanying drawings are for understanding the exemplary embodiment disclosed in the specification and the technical spirit disclosed in the specification is not limited by the accompanying drawings and it should appreciated that the accompanying drawings include all changes, equivalents, or substitutions included in the spirit and the technical scope of the present invention.

Singular expressions used herein may include plurals expressions unless they have definitely opposite meanings in the context.

FIG. 1 is a cross-sectional view of a display device according to an exemplary embodiment of the present invention.

Figure 2:
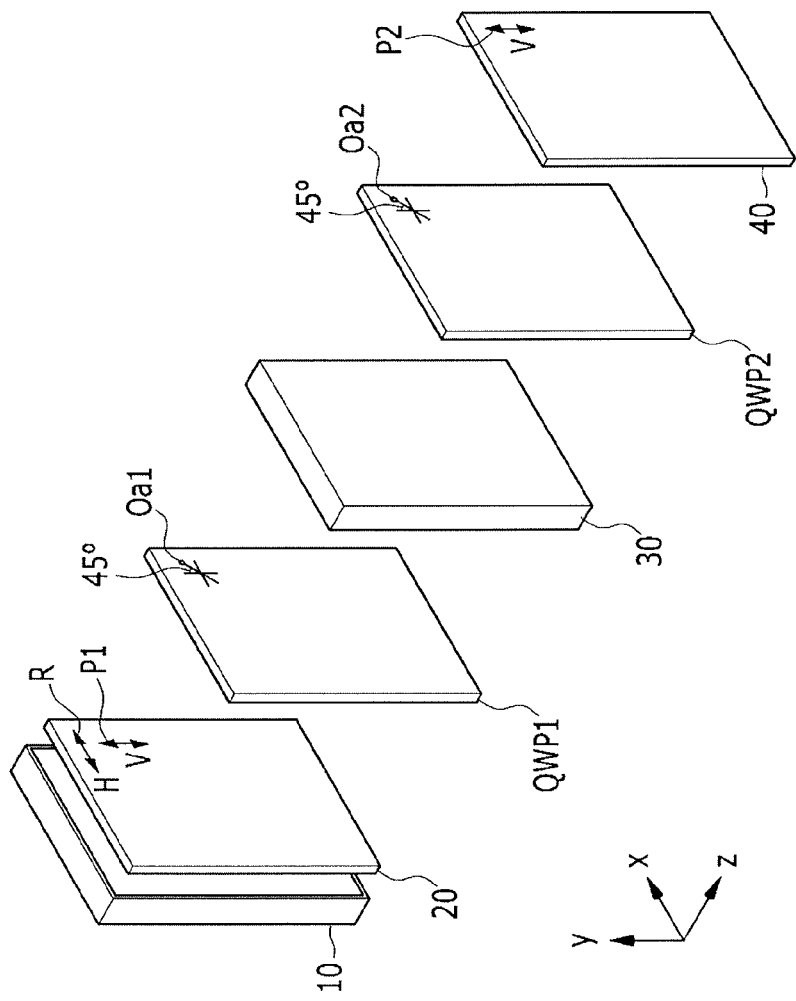
FIG. 2 illustrates a configuration of a display device according to an exemplary embodiment of the present invention.

FIG. 2 illustrates a configuration of a display device according to an exemplary embodiment of the present invention.

Hereinafter, a display device according to an exemplary embodiment of the present invention will be described with reference to FIGS. 1 and 2.

Referring to FIG. 1, the display device includes a display panel 10, a reflective polarizer 20, a first quarter-wave plate QWP1, a liquid crystal lens 30, a second quarter-wave plate QWP2, and a polarizer 40.

The display panel 10 includes a backlight unit 101, a first display polarizer 102, a first substrate 103, a liquid crystal layer 104, a second substrate 105, and a second display polarizer 106. In the display panel 10, liquid crystal molecules of the liquid crystal layer 104 are aligned according to a voltage potential (e.g., a voltage difference) applied to electrodes formed on the first substrate 103 and the second substrate 105 to display an image. The display panel 10 may be an organic light-emitting display (OLED) panel, a liquid crystal display (LCD) panel, an electrophoretic display (EDP) panel 10, a plasma display (PDP) panel 10, or the like. In an exemplary embodiment of the present invention, as the display panel 10, the liquid crystal display panel (LCD) will be described.

The backlight unit 101 may include a light source that generates light and a light guide that guides the generated light to the display panel 10 and the liquid crystal lens 30. The light source may include at least one light emitting diode (LED) and may be disposed on at least one side of the light guide. For example, the backlight unit 101 may be an edge type light unit in which the light source is positioned on a side of the light guide. However, an exemplary embodiment of the present invention is not limited thereto, and the backlight unit 101 may be a direct type light unit in which the light source is positioned directly below a diffuser and the light source may include a fluorescent lamp. In the specification, an exemplary embodiment in which the display panel 10 is the liquid crystal display panel 10 is described, but the display panel 10 is not limited thereto, and the display panel 10 may be the organic light-emitting display panel 10. When the display panel 10 is the organic light-emitting display panel 10, the backlight unit 101 and the display polarizers 102 and 106 may be omitted.

The first display polarizer 102 polarizes light emitted from the backlight unit 101. A penetration axis of the first display polarizer 102 may be vertical or horizontal. The first display polarizer 102 transmits light of which a polarization direction is parallel to the penetration axis of the first display polarizer 102 and absorbs light of which a polarization direction is substantially vertical to the penetration axis of the first display polarizer 102.

The first substrate 103 includes a plurality of pixels. Each pixel region includes a gate line extending in a row direction, a data line extending in a column direction, and a pixel electrode. The data line may be insulated from the gate line. Further, each pixel may include a thin film transistor which is electrically connected to the gate line and the data line and is electrically connected to the pixel electrode. The thin film transistor provides a driving signal to the corresponding pixel electrode. Further, a driver integrated circuit (IC) may be provided at one side of the first substrate 103. The driver IC receives various signals from the outside, and outputs a driving signal for driving the display panel 10 to the thin film transistor in response to inputted various control signals.

The second substrate 105 may include an RGB color (e.g., red, green, and blue color) filter implementing a predetermined color by using light provided from the backlight unit 101 on one side, and a common electrode formed on the RGB color filter. The common electrode faces the pixel electrode. Here, the RGB color filter may be formed through a thin film process. In an exemplary embodiment of the present invention, a case in which the color filter (e.g., the RGB color filter) is formed on the second substrate 105 is described as an example, but the present invention is not limited thereto. For example, the color filter may be formed on the first substrate 103. Further, the common electrode of the second substrate 105 may be formed on the first substrate 103.

The liquid crystal layer 104 includes a plurality of liquid crystal molecules. The liquid crystal molecules are arranged in a specific direction by a voltage applied to the pixel electrode and the common electrode, and thus, the display panel 10 may display the image by controlling transmittance of the light provided from the backlight unit 101. In an exemplary embodiment of the present invention, when the backlight unit 101 is not present, transmittance of light which is incident or reflected through a front surface of the display panel is controlled to display the image.

The second display polarizer 106 faces the first display polarizer 102 and polarizes light emitted from the display panel 10. A penetration axis of the second display polarizer 106 may be vertical or horizontal. When a penetration axis of the second display polarizer 106 is vertical, the second display polarizer 106 absorbs light having a horizontal polarization direction. In addition, when the penetration axis of the second display polarizer 106 is horizontal, the second display polarizer 106 absorbs light having a vertical polarization direction. In this case, the penetration axis of the second display polarizer 106 is parallel to a penetration axis of the reflective polarizer 20. Accordingly, light penetrating the second display polarizer 106 also penetrates the reflective polarizer 20.

Referring to FIG. 2, the reflective polarizer 20 has a penetration axis P1 in a vertical direction V which is substantially parallel to the penetration axis P1 of the second display polarizer 106. The reflective polarizer 20 includes a reflection axis R in a horizontal direction H which is substantially perpendicular to the penetration axis P1. The reflective polarizer 20 transmits light having a polarization direction parallel to the penetration axis P1 and reflects light having a polarization direction parallel to the reflection axis R. As show in FIG. 1, the reflective polarizer 20 may include a transparent material adhesive layer 201 that bonds the reflective polarizer 20 and the liquid crystal lens 30, however, in an exemplary embodiment of the present invention, the adhesive layer 201 may be omitted. The reflective polarizer 20 may be a reflective polarization film. For example, a reflective polarization separating element (e.g., dual brightness enhancement film (DBEF)), a wire grid polarizer (WGP), a titanium dioxide ($TiO_2$) multilayer film, or the like, may be included in the reflective polarizer 20.

Each of the first quarter-wave plate QWP1 and the second quarter-wave plate QWP2 changes a linearly polarized light incident thereto to a circularly polarized light, or changes a circularly polarized light incident thereto to a linearly polarized light. To this end, each of alignment axes Oa1 and Oa2 of the first and second quarter-wave plates QWP1 and QWP2 form an angle of 45° or 135° with the penetration axis P2 of the polarizer 40, and thus, a phase of the incident light is delayed by ¼ wavelength (λ). The alignment axis Oa1 of the first quarter-wave plate QWP1 may be a slow axis or a fast axis thereof. In addition, the alignment axis Oa2 of the second quarter-wave plate QWP2 may be a slow axis or a fast axis thereof. The quarter-wave plate QWP will be described below in detail.

The liquid crystal lens 30 includes a lower substrate 100, an upper substrate 200, and a liquid crystal layer 31 interposed between the lower substrate and the upper substrate. The liquid crystal lens 30 will be described below in detail.

The polarizer 40 has a penetration axis P2 (see FIG. 2) parallel to the penetration axis of the second display polarizer 106, and transmits light having a polarization direction parallel to the penetration axis P2.

Figure 3A:
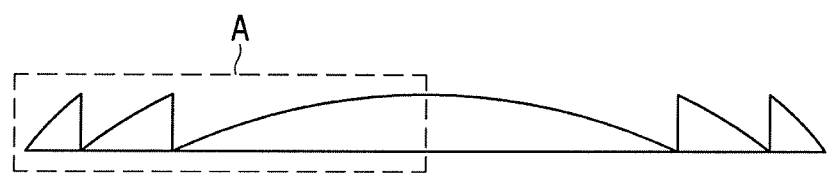
FIG. 3A illustrates a structure of a Fresnel lens.
Figure 3B:
FIG. 3B illustrates a part marked with a dotted line, which is enlarged in FIG. 3A.
Figure 3C:
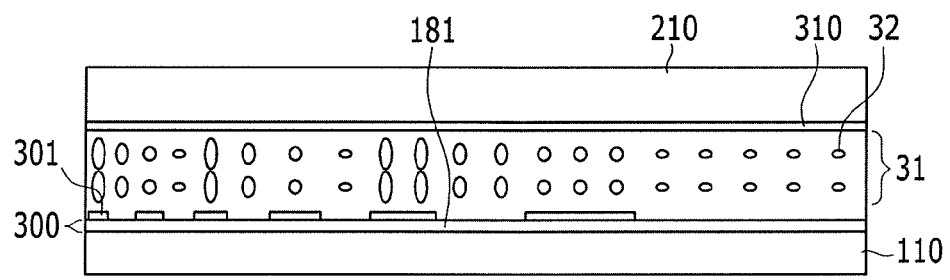
FIG. 3C illustrates a liquid crystal lens according to an exemplary embodiment of the present invention.
Figure 4:
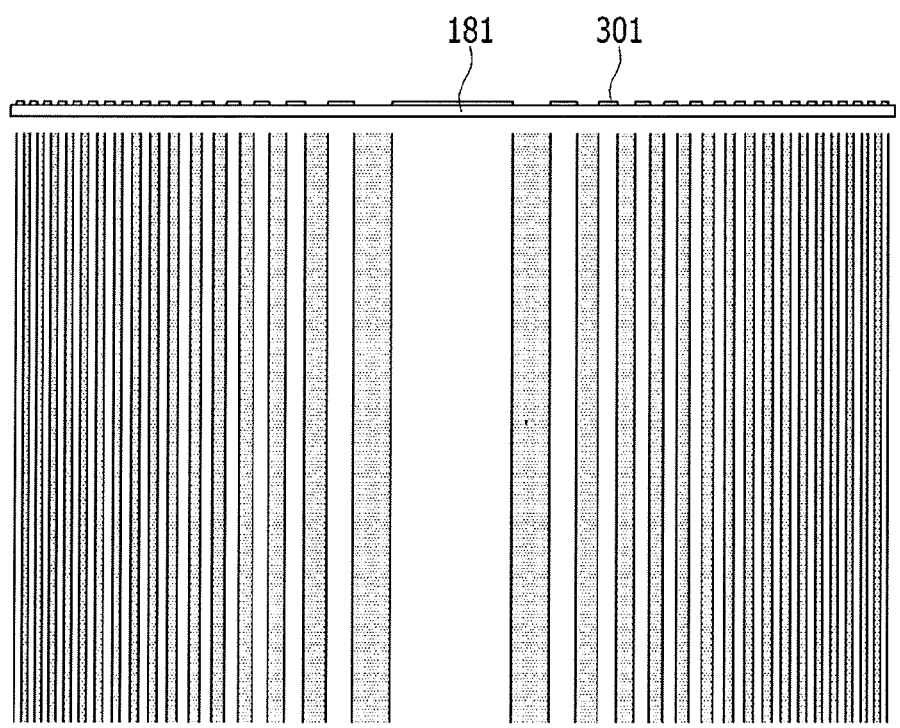
FIG. 4 illustrates a cross-sectional view and a layout view of a lens electrode of a liquid crystal lens according to an exemplary embodiment of the present invention.

FIG. 3A illustrates a structure of a Fresnel lens and FIG. 3B illustrates a part marked with a dotted line, which is enlarged in FIG. 3A. FIG. 3C illustrates a liquid crystal lens according to an exemplary embodiment of the present invention. FIG. 4 illustrates a cross-sectional view and a layout view of a lens electrode of a liquid crystal lens according to an exemplary embodiment of the present invention.

Hereinafter, the liquid crystal lens 30 will be described with reference to FIGS. 3 and 4.

Referring to FIG. 3C, the liquid crystal lens 30 includes a lens lower substrate 110, a lens upper substrate 210 facing the lens lower substrate 110, a liquid crystal layer 31 positioned between the lower substrate 110 and the lens upper substrate 210, a lens electrode 300 positioned between the liquid crystal layer 31 and the lower substrate 110, and a common electrode 310 positioned between the lens upper substrate 210 and the liquid crystal layer 31. The liquid crystal layer 31 includes the liquid crystal molecules 32.

The lens electrode 300 includes the lens lower substrate 110, a first insulating layer 181 formed on the top of the lens lower substrate 110, and a plurality of lower electrodes 301.

FIG. 4 illustrates a cross-sectional view of the lens electrode 300 of the liquid crystal lens 30 and a layout view of the lower electrode 301 of a unit lens according to an exemplary embodiment of the present invention. In the lens electrode 300, the plurality of lower electrodes 301 is arranged in a stripe shape. The lower electrodes 301 are arranged repeatedly in a predetermined pattern and a horizontal electric field may be formed among the plurality of lower electrodes 301 according to a driving signal applied to the liquid crystal lens 30.

In a mirror mode, the driving signal is not applied to the liquid crystal lens 30 so that all of the liquid crystal molecules 32 stand vertically by using a vertical alignment (VA) mode. In a three-dimensional mode (3D), the driving signal is applied to the liquid crystal lens 30 so that the liquid crystal molecules 32 are laid in-plane to have a specific arrangement. Further, in a two-dimensional (2D) mode, the driving signal is applied to the liquid crystal lens 30 so that the liquid crystal molecules 32 are laid in substantially the same direction. The driving signal applied in each mode will be described below in detail.

Referring to FIG. 4, a width of the lower electrode 301 of a unit lens increases in a direction from an outside to the center of the unit lens, but an exemplary embodiment of the present invention is not limited thereto, and widths of the lower electrodes 301 may be substantially the same as each other. The liquid crystal lens 30 serves as a zone plate type liquid crystal lens. A zone plate is referred to as a Fresnel zone plate. The zone plate implements a lens effect that concentrates light on a focal point through diffraction phenomenon of light. The liquid crystal lens 30 according to an embodiment of the present invention functions as a Fresnel lens since various voltages are applied to the plurality of lower electrodes 301 and alignments of the liquid crystal molecules varies according to the voltages applied thereto.

The lower electrode 301 may include a transparent conductive oxide. For example, the lower electrode 301 may include indium tin oxide (ITO), indium zinc oxide (IZO), or the like.

The first insulating layer 181 may include an insulating material that transmits light. For example, the first insulating layer 181 may include silicon nitride (SiNx), silicon oxide (SiOx), or the like. The first insulating layer 181 is formed on the lens lower substrate 110 and the lower electrode 301 is formed on the first insulating layer 181.

The common electrode 310 may be formed by a whole plate. In an embodiment of the present invention, the common electrode 310 might not be formed by the whole plate and may have an individual electrode structure having a similar shape to the lower electrode 301. Further, the common electrode 310 is formed in a specific region, and thus, the liquid crystal lens 30 may be formed in a part of the display panel 10. The liquid crystal lens 30 may have substantially the same shapes as those of the common electrode 310, but an exemplary embodiment of the present invention is not limited to such shapes. The common electrode 310 may include a transparent conductive oxide material. For example, the common electrode 310 may include indium tin oxide (ITO), indium zinc oxide (IZO), or the like. The common electrode 310 and the lower electrode 301 may form a vertical electric field according to the driving signal applied to the liquid crystal lens 30.

The liquid crystal layer 31 may have a thickness of substantially 2 μm to 5 μm. The liquid crystal layer 31 includes the liquid crystal molecules 32. Since the liquid crystal layer 31 has a relatively small thickness, high-speed conversion according to alignment of the liquid crystal molecules 32 is achieved.

When a driving signal (for example, a driving voltage) is applied to the liquid crystal lens 30, a horizontal electric field is formed between the common electrode 310 and the plurality of lower electrodes 301. Further, the horizontal electric field is formed between the neighboring lower electrodes 301.

The liquid crystal molecules 32 may be aligned to have a refractive index of the Fresnel lens by the horizontal electric field and a vertical electric field. A path of light passing through a panel of the liquid crystal lens 30 varies depending on the alignments of the liquid crystal molecules 32. The liquid crystal lens 30 may variously transform light incident from the display panel 10 depending on the variation of the light path. Accordingly, a display device according to an exemplary embodiment of the present invention may operate in various modes such as the 2D mode, the 3D mode, or the like.

Figure 5A:
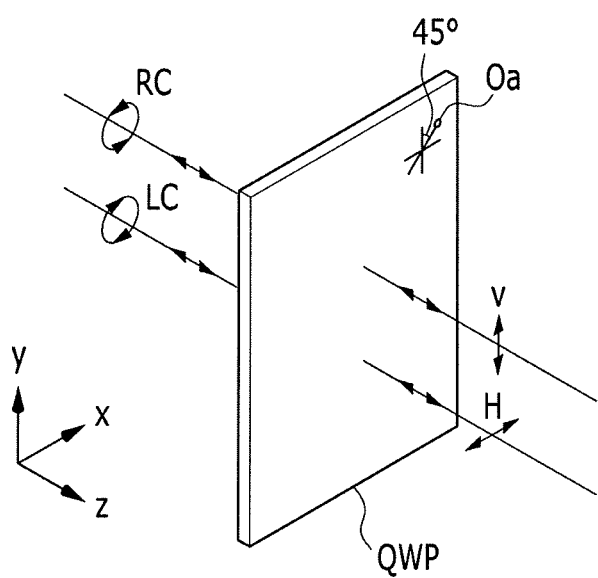
FIGS. 5A and 5B illustrate a quarter-wave plate according to an exemplary embodiment of the present invention.
Figure 5B:
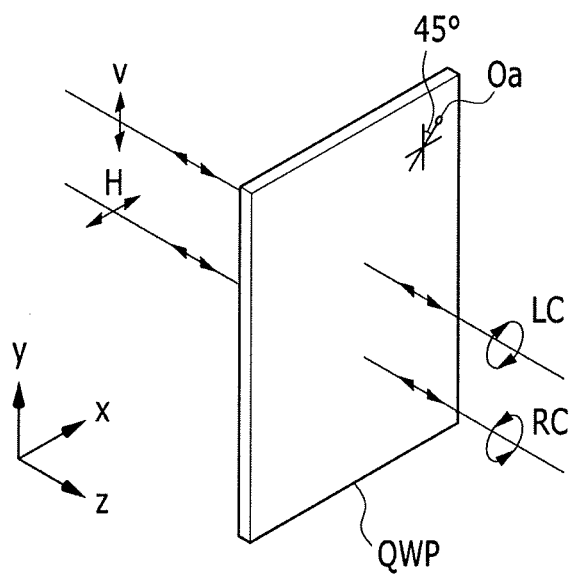

FIGS. 5A and 5B illustrate a quarter-wave plate according to an exemplary embodiment of the present invention.

Hereinafter, the quarter-wave plate according to an exemplary embodiment of the present invention will be described with reference to FIGS. 5A and 5B.

Referring to FIG. 5A, in a quarter-wave plate QWP, a vertical direction V and an alignment axis Oa form an angle of 45°. The quarter-wave plate QWP may change a linearly polarized light of the vertical direction V, which is incident in a −z direction, to a right circularly polarized light, and the quarter-wave plate QWP may change a linearly polarized light of the horizontal direction H, which is incident in the −z direction, to a left circularly polarized light. In addition, the quarter-wave plate QWP may change a left circularly polarized light, which is incident in a +z direction opposite to the −z direction, to a linearly polarized light of the horizontal direction H, and the quarter-wave plate QWP may change a right circularly polarized light, which is incident in the +z direction, to a linearly polarized light of the vertical direction V.

Referring to FIG. 5B, in the quarter-wave plate QWP, the vertical direction V and the alignment axis Oa form the angle of 45°. The quarter-wave plate QWP may change a left circularly polarized light, which is incident in the −z direction, to a linearly polarized light of the vertical direction V, and the quarter-wave plate QWP may change a right circularly polarized light, which is incident in the −z direction, to a linearly polarized light of the horizontal direction H. In addition, the quarter-wave plate QWP may change a linearly polarized light of the vertical direction V, which is incident in the +z direction, to a left circularly polarized light, and the quarter-wave plate QWP may change a linearly polarized light of the horizontal direction H, which is incident in the +z direction, to a right circularly polarized light.

Figure 6:
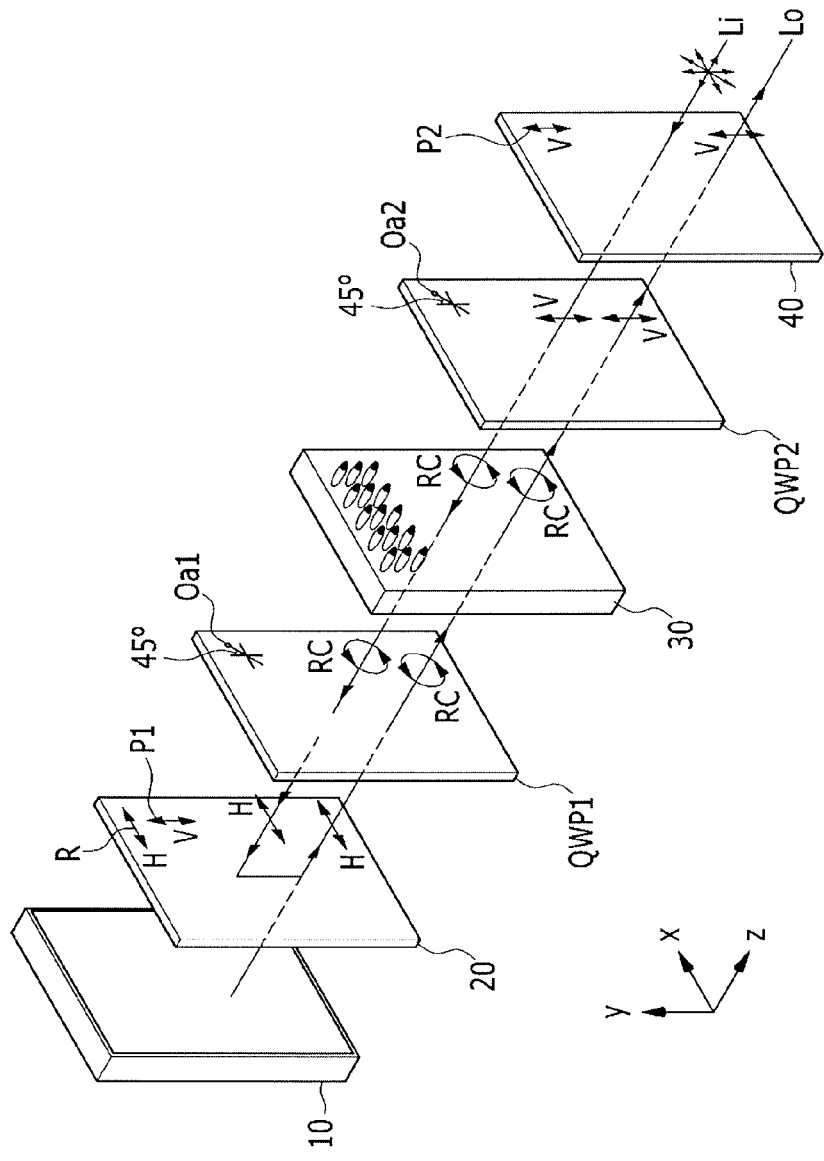
FIG. 6 illustrates a mirror mode operation of a display device according to an exemplary embodiment of the present invention.
Figure 7:
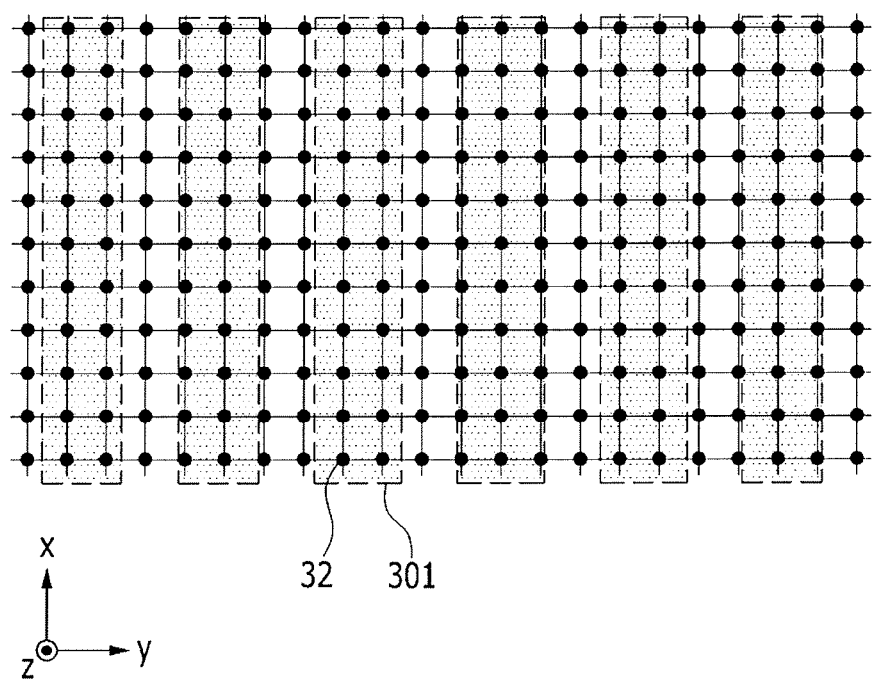
FIG. 7 illustrates director distribution of liquid crystal molecules of a display device in the mirror mode of FIG. 6 according to an exemplary embodiment of the present invention.

FIG. 6 illustrates a mirror mode operation of a display device according to an exemplary embodiment of the present invention. FIG. 7 illustrates director distribution of liquid crystal molecules of a display device in the mirror mode of FIG. 6 according to an exemplary embodiment of the present invention.

Hereinafter, the mirror mode operation of the display device according to an exemplary embodiment of the present invention will be described with reference to FIGS. 6 and 7.

Referring to FIG. 6, the display device may include a display panel 10, a reflective polarizer 20, a first quarter-wave plate QWP1, a liquid crystal lens 30, a second quarter-wave plate QWP2, and a polarizer 40. In this case, the display panel 10 is turned off. The reflective polarizer 20 includes a penetration axis P1 of the vertical direction V and a reflection axis R of the horizontal direction H. An alignment axis Oa1 of the first quarter-wave plate QWP1 and an alignment axis Oa2 of the second quarter-wave plate QWP2 are parallel to each other, and each of the alignment axes Oa1 and Oa2 forms an angle of 45° with respect to the penetration axis P1 of the reflective polarizer 20. In this case, no voltage is applied to the common electrode 310 and the lower electrode 301 of the liquid crystal lens 30, and thus, the liquid crystal lens 30 is turned off. Alignments of the liquid crystal molecules 32 of the liquid crystal layer 31 will be described below. The polarizer 40 includes a penetration axis P2 of the vertical direction V.

Incident light Li is incident to the polarizer 40 in the −z direction, and penetration light Lo is emitted from the polarizer 40 in the +z direction.

The incident light Li is incident to the polarizer 40 and a vertical direction component of the light Li passes through the polarizer 40. The vertical direction V is parallel to the penetration axis P2 of the polarizer 40. The light Li passing through the polarizer 40 is incident to the second quarter-wave plate QWP2 and is changed to a right circularly (RC) polarized light Li when passing through the second quarter-wave plate QWP2, and the right circularly polarized light Li is incident to the liquid crystal lens 30.

In this case, since the liquid crystal lens 30 is turned off, the liquid crystal molecules 32 stand parallel to −z direction in which the incident light Li progresses. This may be understood to mean that the light Li passes through an isotropic material. When the light Li passes through the liquid crystal lens 30, the polarization direction (e.g., the right circularly polarized direction) of the light Li is maintained.

The right circularly polarized light Li that passes through the liquid crystal lens 30 is incident to the first quarter-wave plate QWP1. The right circularly polarized light Li is changed to a linearly polarized light through the first quarter-wave plate QWP1. The linearly polarized light is incident to the reflective polarizer 20. In this case, the linearly polarized light incident to the reflective polarizer 20 has a horizontal polarization direction which is rotated by 90° from a polarization direction of the light Li incident to the polarizer 40.

Since the polarization direction of the linearly polarized light Li incident to the reflective polarizer 20 is parallel to the reflection axis R of the reflective polarizer 20, the linearly polarized incident light Li does not pass through the reflective polarizer 20 and is reflected therefrom to form the penetration light Lo. The penetration light Lo passes through the first quarter-wave plate QWP1, the liquid crystal lens 30, the second quarter-wave plate QWP2, and the polarizer 40 one after another along an opposite path to that of the incident light Li, a phase difference becomes π radians (180°), and thus, the penetration light Lo incident to the polarizer 40 is linearly polarized in a direction parallel to penetration axis P2 of the polarizer 40.

In this case, since the display panel 10 is turned off in the mirror mode, incident light Li (e.g., ambient light) that is incident from the outside of the display device is reflected from the reflective polarizer 20, and thus, the display device operates as a mirror.

When the display panel 10 is turned on, a polarization direction of light, which is emitted from the display panel 10 and passes through the reflective polarizer 20, is linearly polarized in the horizontal direction H. The linearly polarized light passes through the first quarter-wave plate QWP1, the liquid crystal lens 30, and the second quarter-wave plate QWP2 one after another. Accordingly, an image light of the display panel 10, which is linearly polarized in the horizontal direction H, is perpendicular to the penetration axis P2 of the polarizer 40, and thus, the image light does not pass through the polarizer 40.

Referring to FIG. 7, since the electric field applied to the liquid crystal layer 31 is not present near or at the lower electrode 301, the liquid crystal molecules 32 of the liquid crystal layer 31 are arranged in the z-axis direction in which the incident light Li and the penetration light Lo progress. Therefore, the director distribution of the liquid crystal layer 31 does not influence the polarization direction of the light passing through the liquid crystal lens 30.

Figure 8:
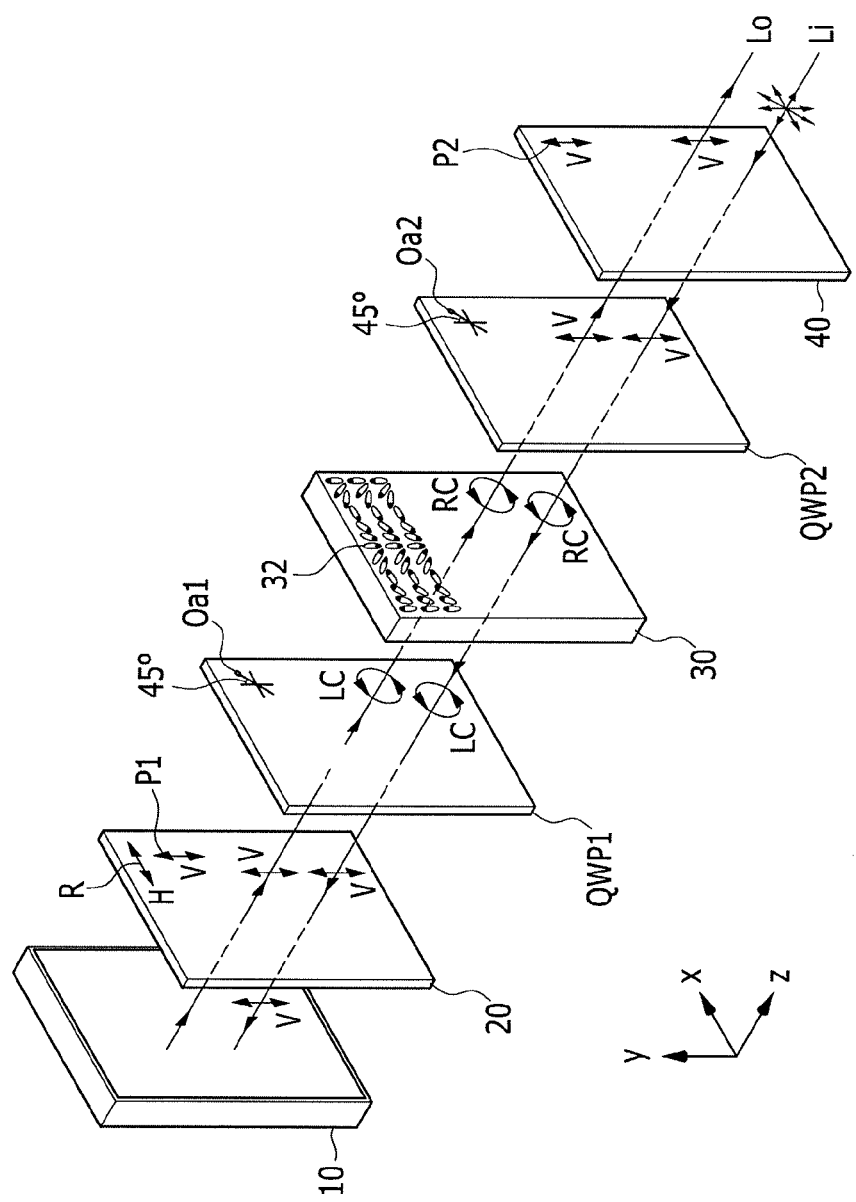
FIG. 8 illustrates a three-dimensional (3D) mode operation of a display device according to an exemplary embodiment of the present invention.
Figure 9:
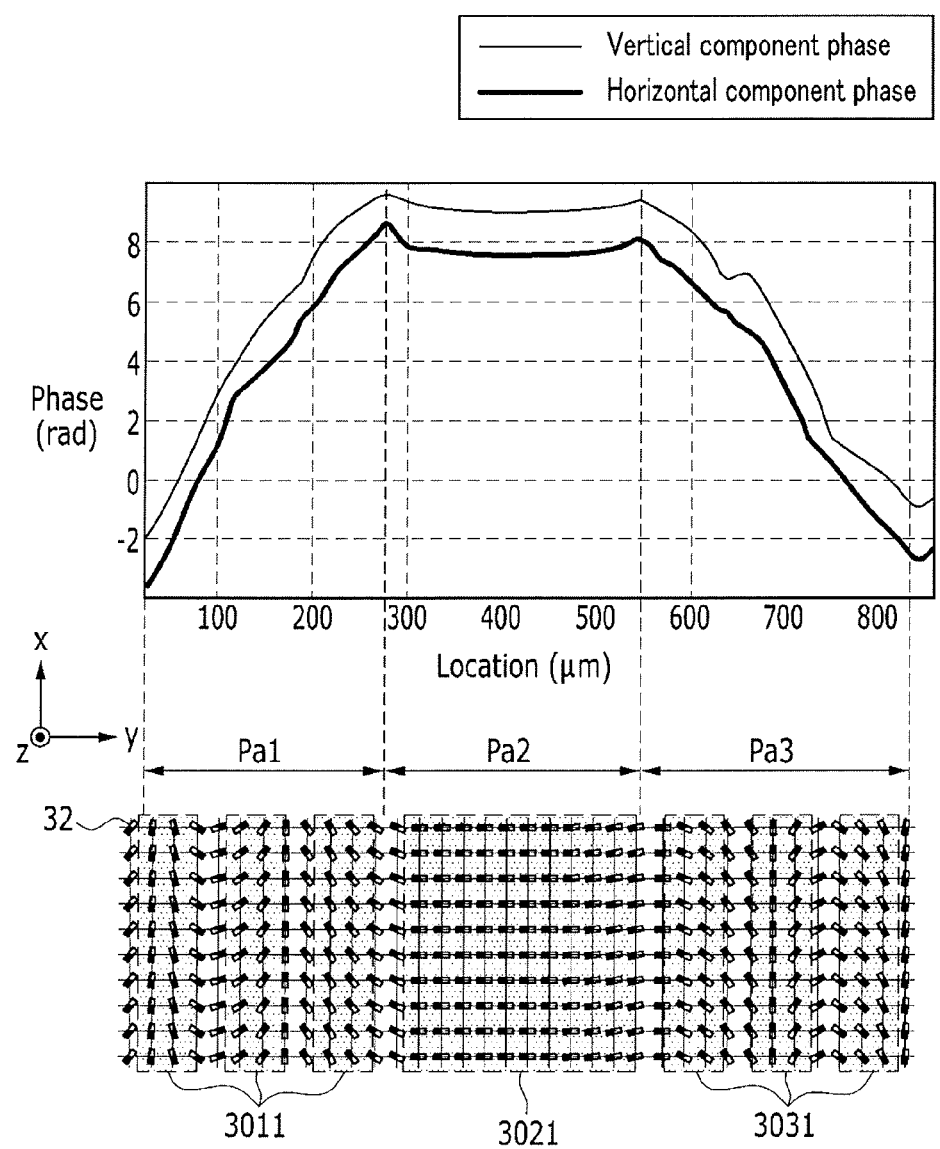
FIG. 9 illustrates director distribution of liquid crystal molecules of a display device in the 3D mode of FIG. 8 according to an exemplary embodiment of the present invention.

FIG. 8 illustrates a 3D mode operation of a display device according to an exemplary embodiment of the present invention, and FIG. 9 illustrates director distribution of liquid crystal molecules of a display device in the 3D mode of FIG. 8 according to an exemplary embodiment of the present invention.

Hereinafter, the 3D mode operation of the display device according to an exemplary embodiment of the present invention will be described with reference to FIGS. 8 and 9.

Referring to FIG. 8, the reflective polarizer 20 includes the penetration axis P1 of the vertical direction V and the reflection axis of the horizontal direction H. The alignment axis Oa1 of the first quarter-wave plate QWP1 and the alignment axis Oa2 of the second quarter-wave plate QWP2 are parallel to each other. Each of the alignment axes Oa1 and Oa2 forms an angle of 45° with respect to the penetration axis P1 of the reflective polarizer 20. A predetermined voltage is applied to the common electrode 310 and the lens electrode 301 of the liquid crystal lens 30 to realize a lens effect. The alignments of the liquid crystal molecules 32 of the liquid crystal layer 31 will be described below. The polarizer 40 includes a penetration axis P2 of the vertical direction V.

Incident light Li is incident to the polarizer 40 in the −z direction, and penetration light Lo is emitted from the polarizer 40 in the +z direction. The penetration light Lo may include light which is emitted from the display panel and is incident to the reflective polarizer 20.

Incident light Li is incident to the polarizer 40 and a vertical direction component of the light Li passes through the polarizer 40. The vertical direction V is parallel to the penetration axis P2 of the polarizer 40. The incident light Li passing through the polarizer 40 is changed to a right circularly polarized light Li when passing through the second quarter-wave plate QWP2, and the right circularly polarized light Li is incident to the liquid crystal lens 30. In this case, the liquid crystal molecules 32 are laid in a predetermined direction so that the incident light Li and the penetration light Lo have a phase difference of π radians. When the right circularly polarized light Li passes through the liquid crystal molecules 32, which are laid in the predetermined direction, the right circularly polarized light Li may be changed to a left circularly polarized light Li. For example, when the light Li incident to the liquid crystal molecules 32 is left circularly polarized, the light Li passing through the liquid crystal molecules 32 may be right circularly polarized. For example, the liquid crystal molecules 32 laid in the predetermined direction may change a rotational direction of circularly polarized light incident thereto.

The left circularly polarized light Li is incident to the first quarter-wave plate QWP1. The left circularly polarized light Li is changed to a linearly polarized light in the vertical direction V when passing through the first quarter-wave plate QWP1. The linearly polarized light in the vertical direction V is incident to the reflective polarizer 20. Since the polarization direction (e.g., the horizontal direction H) of the linearly polarized light Li incident to the reflective polarizer 20 is parallel to the penetration axis P1 of the reflective polarizer 20, the polarized incident light Li passes through the reflective polarizer 20 to be absorbed or scattered in the display panel 10.

Further, a progress direction of the penetration light Lo, which is emitted from the display panel 10 and is incident to the reflective polarizer 20 and the first quarter-wave plate QWP1, is refracted by the liquid crystal molecules 32 of the liquid crystal layer 31 and thus, a binocular disparity is generated. In this case, a driving signal applied to the lower electrode 301 is applied according to a predetermined voltage distribution so that the liquid crystal lens 30 operates as the Fresnel lens of FIG. 3A.

The penetration light Lo in which the binocular disparity occurs passes through the second quarter-wave plate QWP2 and the polarizer 40 one after another along an opposite path to that of the incident light Li, a phase difference may become π radians (180°), and thus, penetration light Lo incident to the polarizer 40 is linearly polarized in a direction parallel to the penetration axis P2 of the polarizer 40. Therefore, the binocular disparity occurs in the penetration light Lo emitted from the display panel 10, and thus, a 3D image may be displayed through the penetration light Lo.

As illustrated in FIG. 9, a driving signal is applied to the liquid crystal lens 30 so that the liquid crystal molecules 32 are laid in a predetermined direction to form an inclination area Pa1, a parallel phase inclination area Pa2, and an inverse phase inclination area Pa3 according to a ranking. For example, predetermined driving signals are sequentially applied to lower electrodes 3011, 3021, and 3031, respectively to form the inclination area Pa1, the parallel phase inclination area Pa2, and the inverse phase inclination area Pa3, respectively, according to the ranking.

Therefore, the inclination area Pa1, the parallel phase inclination area Pa2, and the inverse phase inclination area Pa3 according to the ranking may implement the Fresnel lens of FIG. 3A. A progress direction of light incident in the x direction is refracted by the liquid crystal molecules 32. The binocular disparity occurs in the light of which the progress direction is refracted, and thus, a 3D image may be displayed through the refracted light.

Figure 10:
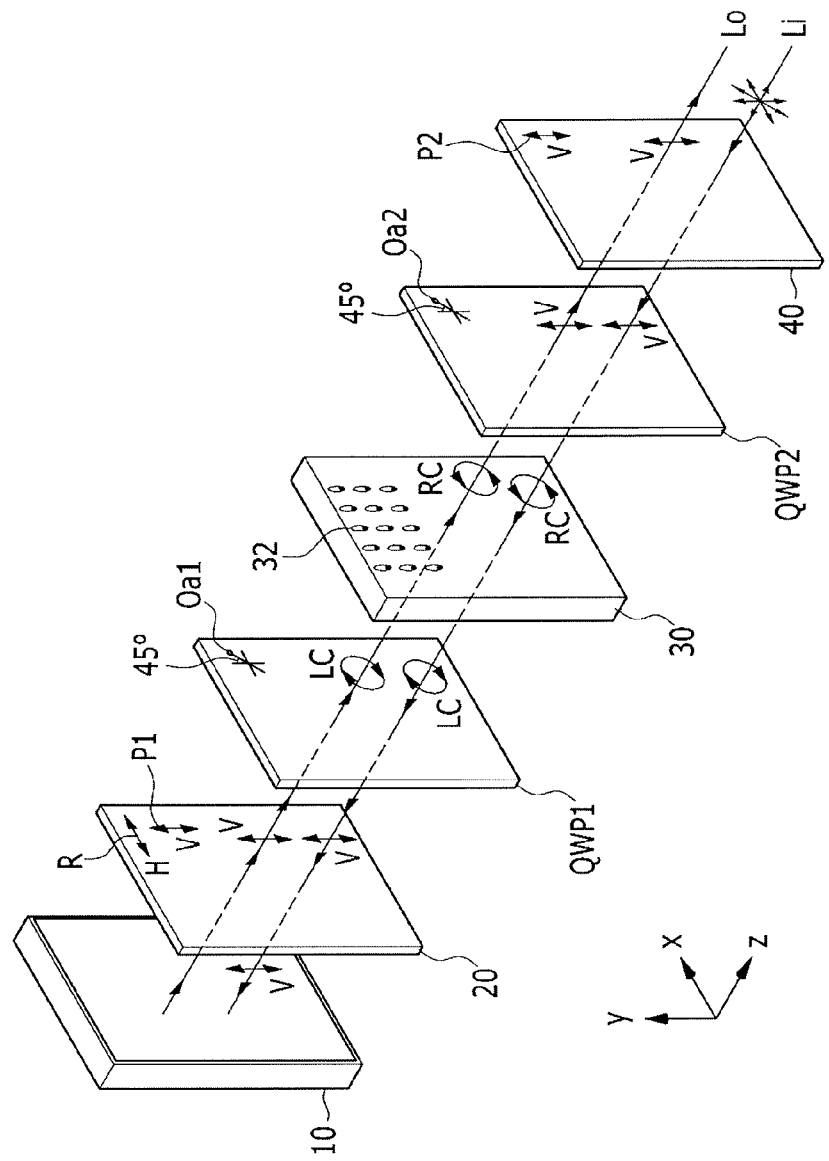
FIG. 10 illustrates a two-dimensional (2D) mode operation of a display device according to an exemplary embodiment of the present invention.

FIG. 10 illustrates a 2D mode operation of a display device according to an exemplary embodiment of the present invention.

Figure 11:
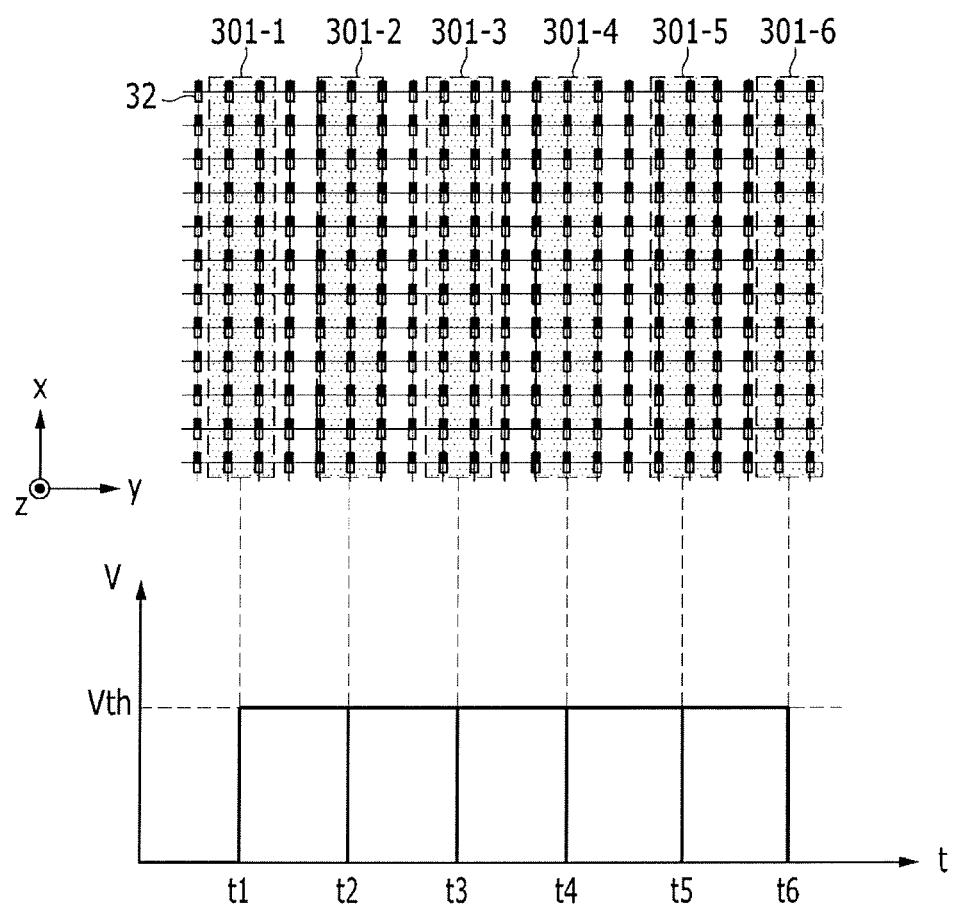
FIGS. 11 to 13 illustrate a voltage applied to a liquid crystal lens in a 2D mode of a display device according to an exemplary embodiment of the present invention.
Figure 12:
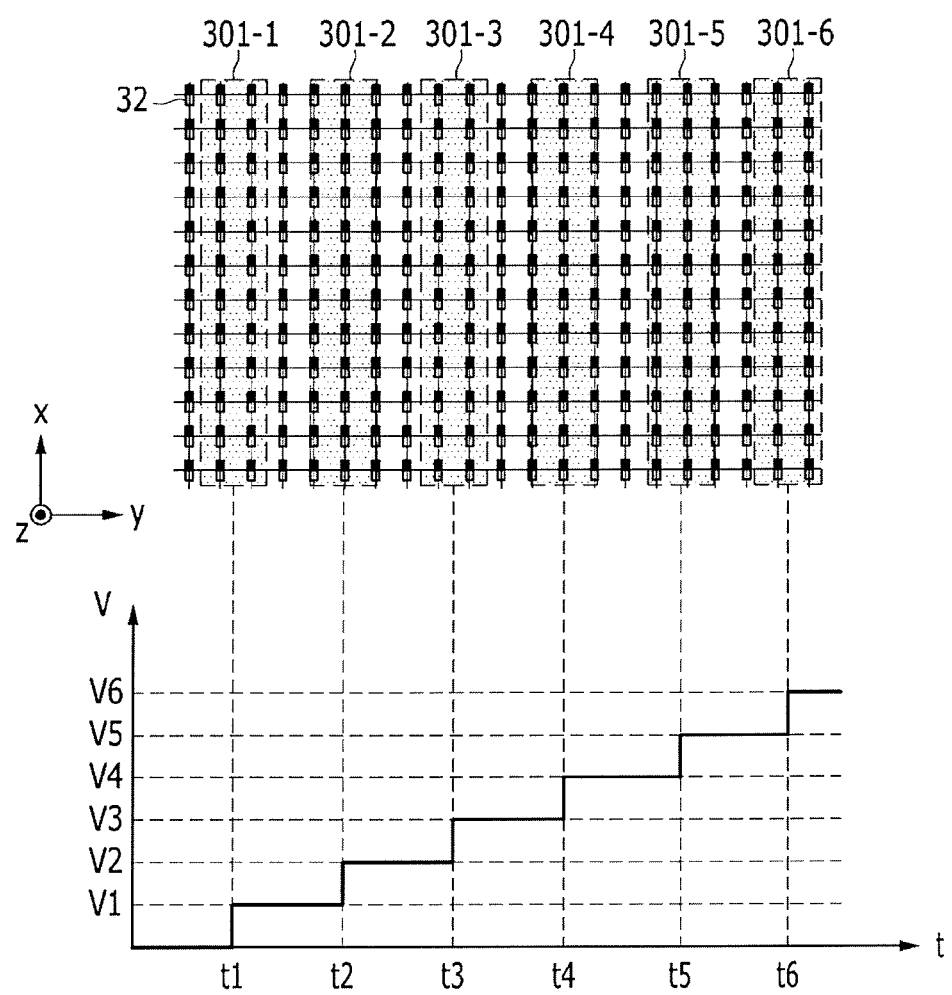
Figure 13:
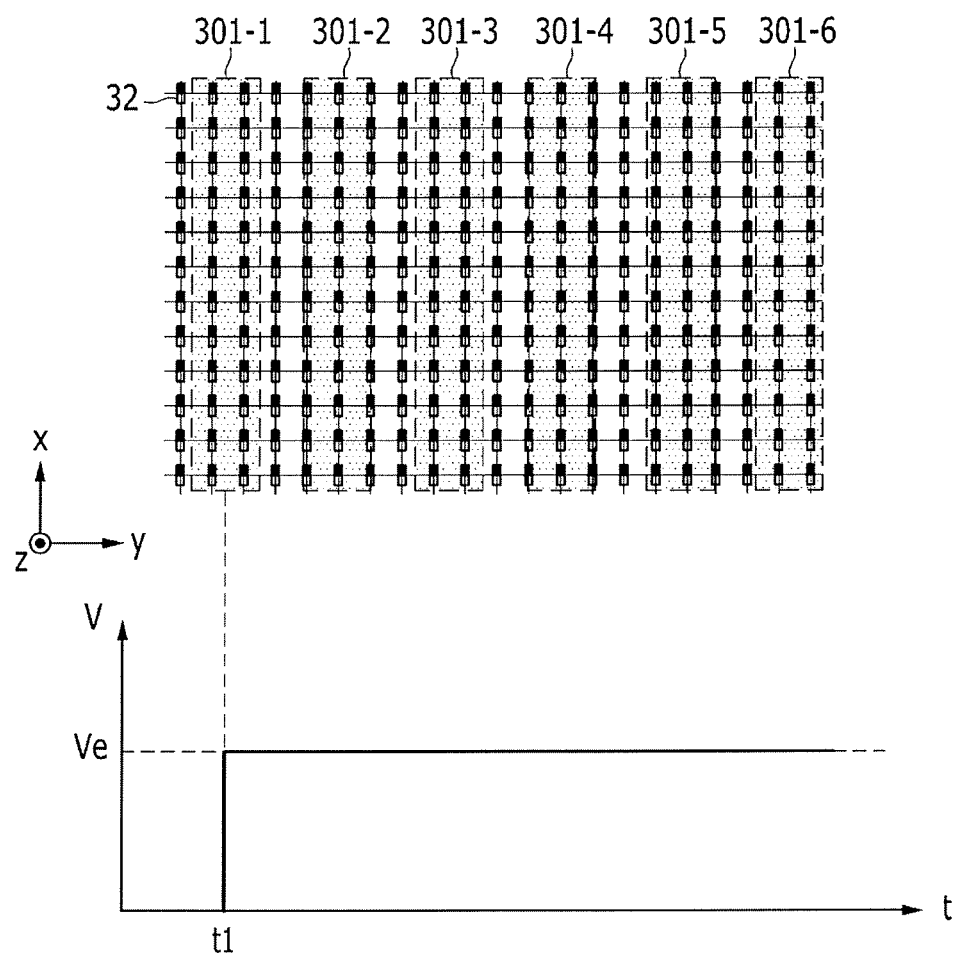

FIGS. 11 to 13 illustrate a voltage applied to a liquid crystal lens in a 2D mode of a display device according to an exemplary embodiment of the present invention.

Hereinafter, the 2D mode operation of the display device according to an exemplary embodiment of the present invention will be described with reference to FIGS. 10 to 13.

Referring to FIG. 10, the reflective polarizer 20 includes the penetration axis P1 of the vertical direction V and the reflection axis of the horizontal direction H. The alignment axis Oa1 of the first quarter-wave plate QWP1 and the alignment axis Oa2 of the second quarter-wave plate QWP2 are parallel to each other. Each of the alignment axes Oa1 and Oa2 forms an angle of 45° with respect to the penetration axis P1 of the reflective polarizer 20. For example, the voltage is not applied to the common electrode 310 and the lens electrode 301 of the liquid crystal lens 30, and thus, the liquid crystal lens 30 is turned off. Alignments of the liquid crystal molecules 32 of the liquid crystal layer 31 will be described below. The polarizer 40 includes the penetration axis P2 of the vertical direction V.

Incident light Li is incident to the polarizer 40 in the −z direction, and penetration light Lo is emitted from the polarizer 40 in the +z direction. The penetration light Lo may include light, which is emitted from the display panel 10 and is incident to the reflective polarizer 20.

The incident light Li is incident to the polarizer 40 and a vertical direction component of the light Li passes through the polarizer 40. The vertical direction V is parallel to the penetration axis P2 of the polarizer 40. The incident light Li passing through the polarizer 40 is changed to a right circularly polarized light Li when passing through the second quarter-wave plate QWP2, and the right circularly polarized light Li is incident to the liquid crystal lens 30.

In this case, the liquid crystal molecules 32 are laid in a predetermined direction so that the incident light and the penetration light may have a phase difference of π radians. A rotational direction of the circularly polarized light is changed to an opposite direction through the liquid crystal lens 30. For example, the liquid crystal molecules 32, which are laid in the predetermined direction, may change the right circularly polarized light Li to a left circularly polarized light Li. For example, when the light Li incident to the liquid crystal molecules 32 is left circularly polarized, the light Li passing through the liquid crystal molecules 32 may be right circularly polarized. In this case, the driving signal is applied so that the liquid crystal molecules 32 are laid in one direction to prevent the binocular disparity from occurring due to the phase delay of the incident light Li. The driving signal applied to the liquid crystal lens 30 will be described below in detail.

The left circularly polarized light Li is incident to the first quarter-wave plate QWP1 and the reflective polarizer 20. The left circularly polarized light Li is changed to a linearly polarized light in the vertical direction V when passing through the first quarter-wave plate QWP1. The linearly polarized light in the vertical direction V is incident to the reflective polarizer 20. Since the linearly polarized light Li incident to the reflective polarizer 20 is parallel to the penetration axis P1 of the reflective polarizer 20, the linearly polarized incident light Li passes through the reflective polarizer 20 to be absorbed or scattered in the display panel 10.

Further, the penetration light Lo that is emitted from the display panel 10 and is incident to the first quarter-wave plate QWP1 goes through an opposite path to that of the incident light Li by passing through the second quarter-wave plate QWP2 and the polarizer 40. And a phase difference between the incident light and the penetration light is generated as π radians. The penetration light Lo incident to the polarizer 40 is a linearly polarized light in a vertical direction V parallel to the penetration axis P2 of the polarizer 40. Therefore, the penetration light Lo emitted from the display panel 10 becomes a 2D image without the phase delay.

Referring to FIG. 11, substantially the same threshold driving signal Vth is sequentially applied to a plurality of lower electrodes 301-1 to 301-6, respectively, at a corresponding one of a plurality of time points t1 to t6 so that the director distribution of the plurality of liquid crystal molecules 32 is in the x direction. At the threshold driving signal Vth, the liquid crystal molecules 32 are laid in the x direction. For easy description, the liquid crystal molecules 32 are distributed in the x direction, but the present invention is not limited thereto, and the director distribution of the plurality of liquid crystal molecules 32 may be in the x direction or y direction.

Referring to FIG. 12, a plurality of driving signals V1 to V6 is sequentially applied to the corresponding lower electrodes 301-1 to 301-6, respectively, at a corresponding one of the plurality of time points t1 to t6 so that the director distribution of the plurality of liquid crystal molecules 32 are in the x direction. Here, the driving signal V1 is a voltage lower than the threshold driving signal Vth and the driving signal V6 is a voltage higher than the threshold driving signal Vth. When the driving signals are increased in a step-wise manner and are applied to the plurality of lower electrodes 301-1 to 301-6 (for example, V1<V2<v3<V4<V5<V6), the director distribution of the plurality of liquid crystal molecules 32 is laid in the x direction.

Referring to FIG. 13, a driving signal Ve is simultaneously applied to the plurality of lower electrodes 301-1 to 301-6 at a point of time t1 so that the director distribution of the plurality of liquid crystal molecules 32 is in the x direction. When the driving signal Ve is simultaneously applied to the plurality of lower electrodes 301-1 to 301-6, the director distribution of the plurality of liquid crystal molecules 32 is laid in the x direction.

As described above, the number of the plurality of lower electrodes 301-1 to 301-6 is 6 as an example, but an exemplary embodiment of the present invention is not limited thereto.

Figure 14:
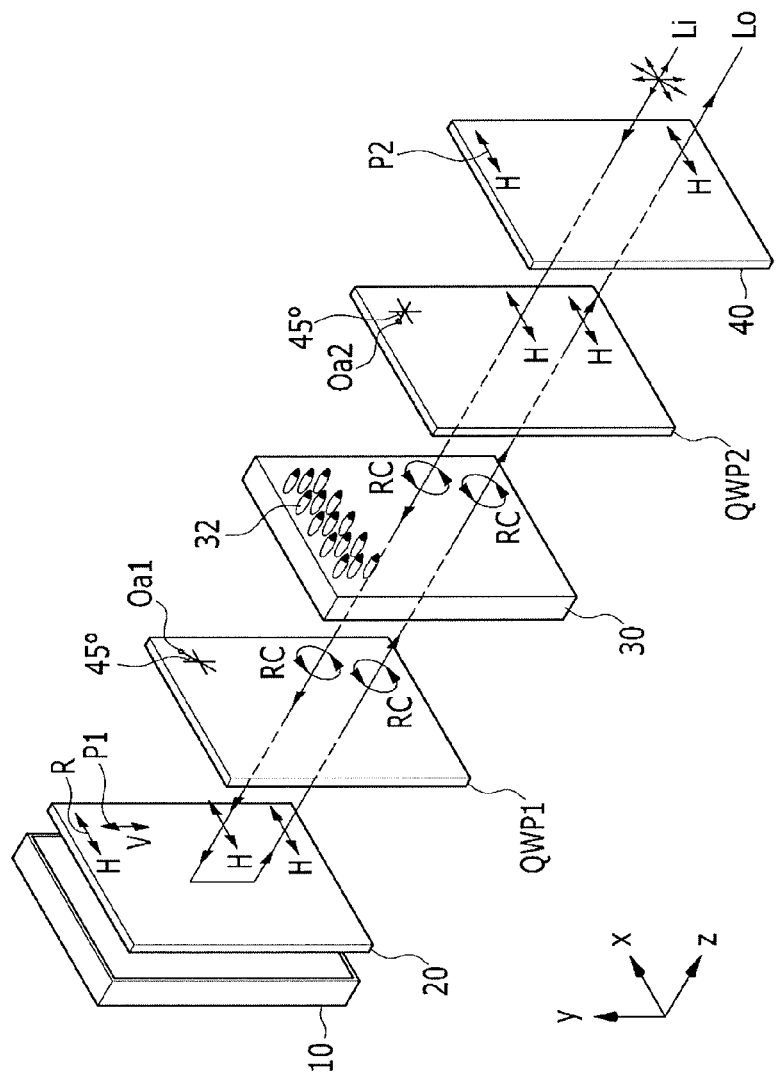
FIG. 14 illustrates a mirror mode operation of a display device according to an exemplary embodiment of the present invention.
Figure 15:
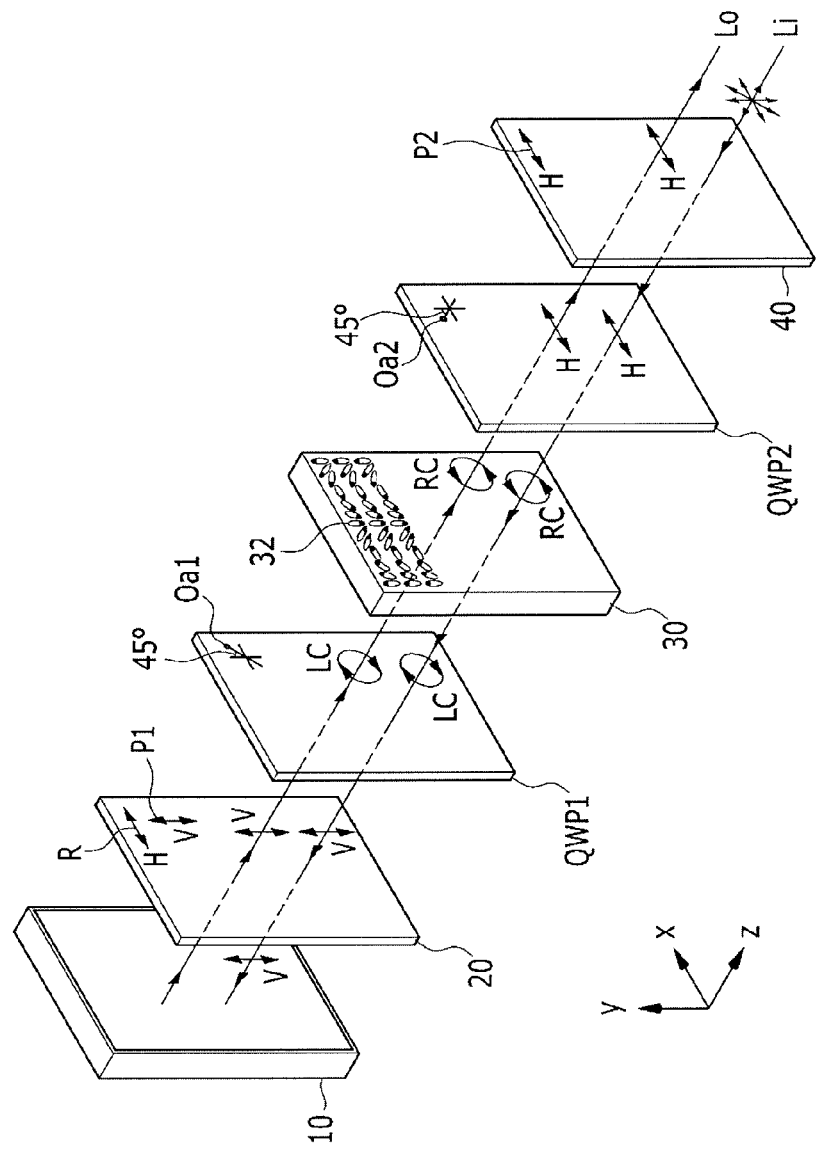
FIG. 15 illustrates a 3D mode operation of a display device according to an exemplary embodiment of the present invention.
Figure 16:
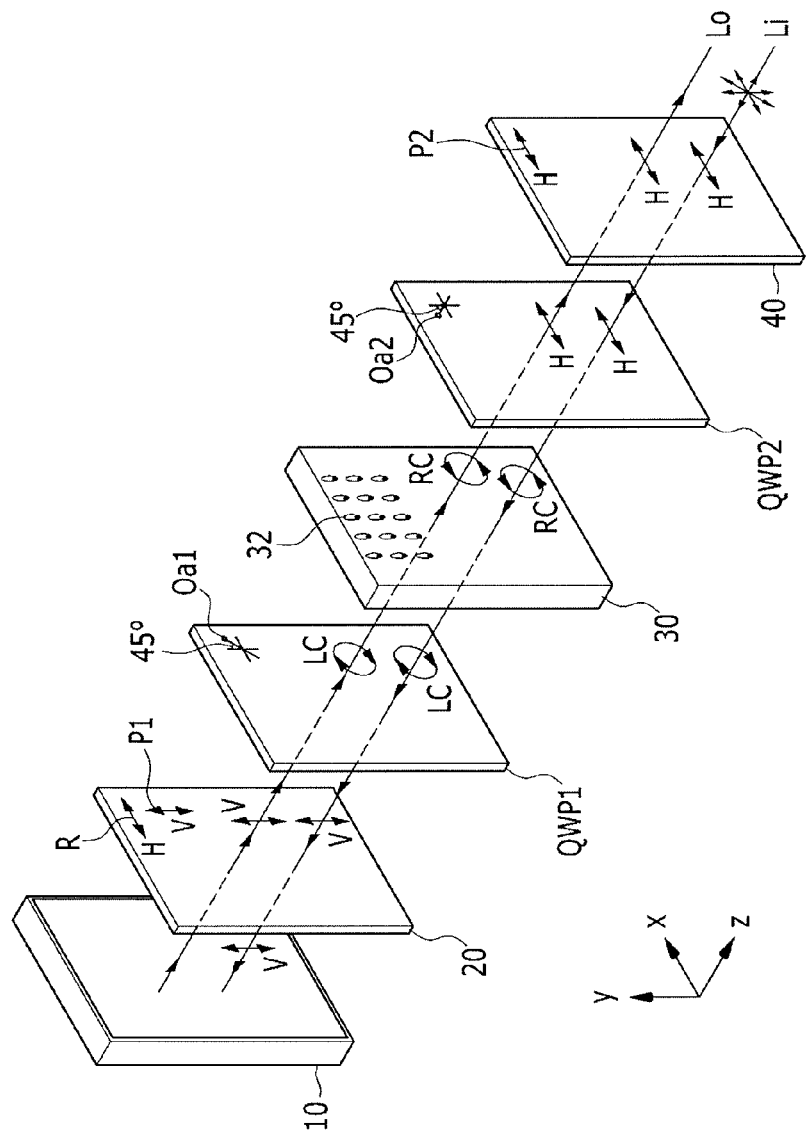
FIG. 16 illustrates a 2D mode operation of a display device according to an exemplary embodiment of the present invention.

FIG. 14 illustrates a mirror mode operation of a display device according to an exemplary embodiment of the present invention. FIG. 15 illustrates a 3D mode operation of a display device according to an exemplary embodiment of the present invention. FIG. 16 illustrates a 2D mode operation of a display device according to an exemplary embodiment of the present invention.

Hereinafter, the display device according to an exemplary embodiment of the present invention will be described with reference to FIGS. 14 to 16.

Like reference numerals may designate like elements throughout the specification and drawings. Duplicate descriptions will be omitted.

Referring to FIGS. 14 to 16, an alignment axis Oa1 of the first quarter-wave plate QWP1 and an alignment axis Oa2 of the second quarter-wave plate QWP2 are vertical to each other. A penetration axis P1 of the reflective polarizer 20 and a penetration axis P2 of the polarizer 40 are vertical to each other.

Hereinafter, a mirror mode operation of a display device according to an exemplary embodiment of the present invention will be described with reference to FIG. 14.

Referring to FIG. 14, incident light Li is incident to the polarizer 40 and a horizontal direction component of the light Li passes through the polarizer 40. The light Li passing through the polarizer 40 is changed to a right circularly polarized light Li when passing through the second quarter-wave plate QWP2, and the right circularly polarized light Li is incident to the liquid crystal lens 30.

In this case, since the liquid crystal lens 30 is turned off, the liquid crystal molecules 32 stand in parallel −z direction in which the incident light Li progresses. This may be understood to mean that the incident light Li passes through an isotropic material. When the incident light Li passes through the liquid crystal lens, the polarization direction (e.g., the right circular polarization direction) of the incident light Li maintains.

The right circularly polarized light Li that passes through the liquid crystal lens 30 is incident to the first quarter-wave plate QWP1. The right circularly polarized light Li is changed to a linearly polarized light in the horizontal direction H through the first quarter-wave plate QWP1. The linearly polarized light is incident to the reflective polarizer 20.

Since the polarization direction (e.g., the horizontal direction H) of the linearly polarized light Li incident to the reflective polarizer 20 is parallel to the reflection axis R of the reflective polarizer 20, the linearly polarized incident light Li does not pass through the reflective polarizer 20 and is reflected to form the penetration light Lo. The penetration light Lo passes through the first quarter-wave plate QWP1, the liquid crystal lens 30, the second quarter-wave plate QWP2, and the polarizer 40 one after another along an opposite path to that of the incident light Li. Thus, light incident to the polarizer 40 is linearly polarized in the horizontal direction H parallel to the penetration axis P2 of the polarizer 40.

Therefore, since the display panel 10 is turned off in the mirror mode, incident light Li that is incident from the outside of the display device is reflected, and thus, the display device operates as a mirror.

In the mirror mode according to an exemplary embodiment of the present invention, since the driving signal applied to the lower electrode 301 is the same as that in FIG. 7, description of the driving signal will be omitted.

Hereinafter, a 3D mode operation of a display device according to an exemplary embodiment of the present invention will be described with reference to FIG. 15.

Referring to FIG. 15, incident light Li is incident to the polarizer 40 and a horizontal direction H component of the light Li passes through the polarizer 40. The horizontal direction H is parallel to the penetration axis P2 of the polarizer 40. The incident light Li passing through the polarizer 40 is changed to a right circularly polarized light Li when passing through the second quarter-wave plate QWP2, and the right circularly polarized light Li is incident to the liquid crystal lens 30. In this case, the liquid crystal molecules 32 are laid in a predetermined direction so that the incident light and the penetration light have a phase difference of π radians. A rotational direction of the circularly polarized light is changed to an opposite direction through the liquid crystal molecules 32. For example, the liquid crystal molecules 32, which are laid in the predetermined direction, may change the right circularly polarized light Li to a left circularly polarized light Li. For example, when the light Li incident to the liquid crystal molecules 32 is left circularly polarized, the light Li passing through the liquid crystal molecules 32 may be right circularly polarized.

The left circularly polarized light Li is incident to the first quarter-wave plate QWP1. The left circularly polarized light Li is changed to a linearly polarized light in the vertical direction V when passing through the first quarter-wave plate QWP1. The linearly polarized light in the vertical direction V is incident to the reflective polarizer 20. Since the linearly polarized light Li incident to the reflective polarizer 20 is parallel to the penetration axis P1 of the reflective polarizer 20, the linearly polarized incident light Li passes through the reflective polarizer 20 to be absorbed or scattered in the display panel 10.

Further, a phase of the penetration light Lo, which is emitted from the display panel 10 and is incident to the reflective polarizer 20 and the first quarter-wave plate QWP1, is delayed by the alignment of the liquid crystal molecules 32 of the liquid crystal layer 31, and thus, a binocular disparity is achieved. The penetration light Lo in which the binocular disparity occurs passes through the second quarter-wave plate QWP2 and the polarizer 40 one after another along an opposite path to that of the incident light Li, and thus, a phase difference may become π radians (180°) and the penetration light Lo incident to the polarizer 40 is linearly polarized in a direction parallel to the penetration axis P2 of the polarizer 40. Therefore, the binocular disparity is generated in the penetration light Lo emitted from the display panel 10, and thus, a 3D image may be displayed through the penetration light Lo.

In the 3D mode according to an exemplary embodiment of the present invention, since the driving signal applied to the lower electrode 301 is the same as that in FIG. 9, description of the driving signal will be omitted.

Hereinafter, a 2D mode operation of a display device according to an exemplary embodiment of the present invention will be described with reference to FIG. 16.

Referring to FIG. 16, incident light Li is incident to the polarizer 40 and a horizontal direction component of the light Li passes through the polarizer 40. The horizontal direction is parallel to the penetration axis P2 of the polarizer 40. The incident light Li passing through the polarizer 40 is changed to a right circularly polarized light Li when passing through the second quarter-wave plate QWP2, and the right circularly polarized light Li is incident to the liquid crystal lens 30. In this case, the liquid crystal molecules 32 are laid in a predetermined direction so that the incident light and the penetration light have a phase difference of π radians. A rotational direction of the circularly polarized light is changed to an opposite direction through the liquid crystal molecules 32. For example, the liquid crystal molecules 32, which are laid in the predetermined direction, may change the right circularly polarized light Li to a left circularly polarized light Li. For example, when the light Li incident to the liquid crystal molecules 32 is left circularly polarized, the light Li passing through the liquid crystal molecules 32 may be right circularly polarized. In this case, the driving signal is applied so that the directors of the liquid crystal molecules 32 are laid in one direction to prevent the binocular disparity from occurring due to the phase delay of the incident light Li.

The left circularly polarized light Li is incident to the first quarter-wave plate QWP1. The left circularly polarized light Li is changed to a linearly polarized light Li in the vertical direction V when passing through the first quarter-wave plate QWP1. The linearly polarized light in the vertical direction V is incident to the reflective polarizer 20. Since the linearly polarized incident light Li incident to the reflective polarizer 20 is parallel to the penetration axis P1 of the reflective polarizer 20, the linearly polarized incident light Li passes through the reflective polarizer 20 to be absorbed or scattered in the display panel 10.

Further, the penetration light Lo that is emitted from the display panel 10 and is incident to the reflective polarizer 20 and the first quarter-wave plate QWP1 goes through an opposite path to that of the incident light Li by passing through the second quarter-wave plate QWP2 and the polarizer 40 and a phase difference of π radians is generated. The penetration light Lo incident to the polarizer 40 is a linearly polarized light in a horizontal direction H parallel to the penetration axis P2 of the polarizer 40. Therefore, the penetration light Lo emitted from the display panel 10 becomes a 2D image without the phase delay.

In the 2D mode according to an exemplary embodiment of the present invention, since the driving signal applied to the lower electrode 301 is the same as that in FIGS. 11 to 13, description of the driving signal will be omitted.

While the present invention has been particularly described with reference to exemplary embodiments thereof, it will be understood that the present invention is not limited to the disclosed embodiments thereof.

What is claimed is:

1. A display device comprising:
   a display panel displaying an image;
   a first polarizer disposed on the display panel, the first polarizer having a reflection axis and reflecting a first light having a polarization direction parallel to the reflection axis;
   a liquid crystal lens including liquid crystal molecules and changing a phase of the first light or a second light according to a driving signal applied to the liquid crystal lens, wherein the second light and the first light travel in opposite directions with respect to each other;
   a first quarter-wave plate disposed between the first polarizer and the liquid crystal lens, the first quarter-wave plate including a first alignment axis and performing conversion between a first circularly polarized light and a first linearly polarized light; and
   a second quarter-wave plate disposed between the liquid crystal lens and a second polarizer having a penetration axis, the second quarter-wave plate including a second alignment axis and performing conversion between a second circularly polarized light and a second linearly polarized light,
   wherein the display device operates in a mirror mode, a three-dimensional (3D) mode, and a two-dimensional (2D) mode according to the driving signal, and
   wherein the first alignment axis and the second alignment axis form an angle of 45 degrees or 135 degrees with respect to the penetration axis of the second polarizer.

2. The display device of claim 1, wherein: the first alignment axis and the second alignment axis are substantially parallel to each other.

3. The display device of claim 2, wherein: the liquid crystal lens includes a plurality of lower electrodes forming an electric field in the liquid crystal molecules according to the driving signal, and arrangement directions of the liquid crystal molecules are determined by the electric field.

4. The display device of claim 3, wherein: in the mirror mode, the liquid crystal molecules are arranged to be substantially vertical with respect to a plane on which the plurality of lower electrodes is arranged.

5. The display device of claim 3, wherein: in the 3D mode, the driving signal is applied so that the liquid crystal molecules are arranged to generate a binocular disparity for the image by changing the phase of the second light pertaining to the image through the arranged liquid crystal molecules.

6. The display device of claim 3, wherein: in the 2D mode, the driving signal is applied so that the liquid crystal molecules are arranged in substantially the same direction on a plane on which the plurality of lower electrodes is arranged.

7. The display device of claim 6, wherein: the driving signal is a first threshold voltage driving signal sequentially applied to the plurality of lower electrodes.

8. The display device of claim 6, wherein: the driving signal is second voltage driving signals increasing in a step-wise manner, and the second voltage driving signals are sequentially applied to the plurality of lower electrodes, respectively.

9. The display device of claim 6, wherein: the driving signal is a third voltage driving signal simultaneously applied to the plurality of lower electrodes.

10. The display device of claim 1, wherein: the first alignment axis and the second alignment axis are substantially vertical with respect to each other.

11. A display device comprising:
- a display panel displaying an image;
- a first polarizer disposed on the display panel, the first polarizer having a reflection axis and a transmission axis, a first quarter-wave plate disposed on the first polarizer, the first quarter-wave plate having a first alignment axis, a liquid crystal lens disposed on the first quarter-wave plate, wherein the liquid crystal lens includes liquid crystal molecules arranged according to a driving signal applied to the liquid crystal lens; and
- a second quarter-wave plate disposed on the liquid crystal lens, the second quarter-wave plate having a second alignment axis a second polarizer having a penetration axis disposed on the second quarter-wave plate, the second polarizer having a penetration axis, wherein the display device operates in a mirror mode, a three-dimensional (3D) mode, and a two-dimensional (2D) mode according to the driving signal applied to the liquid crystal lens, wherein the first polarizer reflects first light having a polarization direction parallel to the reflection axis in the mirror mode, and transmits second light having a polarization direction parallel to the transmission axis in the 3D mode or the 2D mode, and wherein the first alignment axis and the second alignment axis form an angle of 45 degrees or 135 degrees with respect to the penetration axis of the second polarizer.

* * * * *